(12) United States Patent
Södergård et al.

(10) Patent No.: US 11,866,218 B2
(45) Date of Patent: Jan. 9, 2024

(54) SAFETY LIFTING DEVICE

(71) Applicant: EVOLABEL AB, Gothenburg (SE)

(72) Inventors: Jonas Södergård, Västra Frölunda (SE); Gerard Dijkstra, Mölndal (SE)

(73) Assignee: EVOLABEL AB, Gothenburg (SE)

( * ) Notice: Subject to any disclaimer, the term of this patent is extended or adjusted under 35 U.S.C. 154(b) by 650 days.

(21) Appl. No.: 17/057,262

(22) PCT Filed: May 14, 2019

(86) PCT No.: PCT/SE2019/050434
§ 371 (c)(1),
(2) Date: Nov. 20, 2020

(87) PCT Pub. No.: WO2019/226093
PCT Pub. Date: Nov. 28, 2019

(65) Prior Publication Data
US 2021/0309405 A1   Oct. 7, 2021

(30) Foreign Application Priority Data

May 24, 2018  (SE) ..................... 1850622-0

(51) Int. Cl.
*B65C 1/00*   (2006.01)
*B65C 9/00*   (2006.01)
(Continued)

(52) U.S. Cl.
CPC ............... *B65C 1/021* (2013.01); *B65C 9/26* (2013.01); *B65C 9/46* (2013.01); *B65G 41/003* (2013.01);
(Continued)

(58) Field of Classification Search
CPC .. B65C 1/00; B65C 1/02; B65C 1/021; B65C 9/00; B65C 9/20; B65C 9/26; B65C 9/40; B65C 9/46
See application file for complete search history.

(56) References Cited

U.S. PATENT DOCUMENTS

| | | | | |
|---|---|---|---|---|
| 5,232,539 A | * | 8/1993 | Carpenter | B65C 9/44 |
| | | | | 156/542 |
| 5,954,913 A | * | 9/1999 | Wurz | B65C 9/1884 |
| | | | | 156/360 |
| 2010/0212305 A1 | * | 8/2010 | Runesson | B25J 19/0012 |
| | | | | 60/459 |

FOREIGN PATENT DOCUMENTS

| | | |
|---|---|---|
| CN | 104847863 A | 8/2015 |
| DE | 4428242 A1 | 2/1996 |

(Continued)

OTHER PUBLICATIONS

International Search Report and Written Opinion for International Application No. PCT/SE2019/050434; International Filing Date May 14, 2019; Report dated Jul. 3, 2019; pp. 1-11.

*Primary Examiner* — Jacob T Minskey
*Assistant Examiner* — Matthew Hoover
(74) *Attorney, Agent, or Firm* — CANTOR COLBURN LLP (57) ABSTRACT

A safety lifting device for positioning a labelling unit in a vertical direction (Z) in relation to a flow of objects where the labelling unit is arranged for printing labels and/or applying labels to the objects. The lifting device includes a linear actuator, a balancing unit, a drive unit connected to the linear actuator, and a movable section. The labelling unit is connected to the movable section. The linear actuator is connected to the movable section and arranged to control the position of the labelling unit. The balancing unit is arranged to counterbalance the gravitational force exerted on the (Continued)

linear actuator. The movable section of the lifting device includes an upper stand unit, and the lifting device further includes a lower stand unit. The upper stand unit is movably arranged in relation to the lower stand unit in the vertical direction.

14 Claims, 4 Drawing Sheets

(51) Int. Cl.
| | | |
|---|---|---|
| *B65C 1/02* | (2006.01) | |
| *B65C 9/26* | (2006.01) | |
| *B65C 9/46* | (2006.01) | |
| *B65G 41/00* | (2006.01) | |
| *F16F 9/02* | (2006.01) | |
| *F16F 9/32* | (2006.01) | |
| *F16F 9/43* | (2006.01) | |
| *F16F 9/56* | (2006.01) | |
| *F16H 25/22* | (2006.01) | |
| *F16H 25/20* | (2006.01) | |
| *F16M 11/28* | (2006.01) | |

(52) U.S. Cl.
CPC ........... *F16F 9/0263* (2013.01); *F16F 9/3292* (2013.01); *F16F 9/435* (2013.01); *F16F 9/56* (2013.01); *F16F 2230/0041* (2013.01); *F16F 2232/08* (2013.01); *F16F 2234/02* (2013.01); *F16H 25/2204* (2013.01); *F16H 2025/204* (2013.01); *F16H 2025/2075* (2013.01); *F16M 11/28* (2013.01)

(56) References Cited

FOREIGN PATENT DOCUMENTS

| | | |
|---|---|---|
| DE | 102010012635 A1 | 9/2011 |
| EP | 0163602 A2 | 12/1985 |
| FR | 2739428 A1 | 4/1997 |
| WO | 9308081 A1 | 4/1993 |

\* cited by examiner

SAFETY LIFTING DEVICE

CROSS REFERENCE TO RELATED APPLICATIONS

This is a U.S. National Stage of Application No. PCT/SE2019/050434, filed on May 14, 2019, which claims the benefit of Swedish Patent Application No. 1850622-0, filed on May 24, 2018, the disclosures of which are incorporated herein by reference.

TECHNICAL FIELD

The present disclosure relates to a safety lifting device that is positioning a labelling unit in a vertical direction in relation to a flow of objects, where the labelling unit is arranged for printing and/or applying labels to the objects. The safety lifting device is displacing the labelling unit in an upwards direction and a downwards direction to a labelling position that is correct for the printing of the labels and/or application of the labels to the objects.

BACKGROUND

Lifting devices are commonly used in labelling applications, where a labelling unit is positioned in a vertical direction in relation to objects that are labelled. The objects that are labelled sometimes have different dimensions and labelling positions and therefore the labelling unit needs to be repositioned to a correct labelling position for the objects to be labelled. The labelling units are often attached to a movable stand that is used for repositioning the labelling unit. Known movable stands are often complex in construction and are repositioning the labelling unit with low speeds. It is also difficult to position the labelling unit with high precision since drive units used need to move heavy loads in short time periods, and therefore are dimensioned with high power to manage high loads. When repositioning the labelling unit there is a risk that the moving labelling unit or a part of the movable stand is interfering with persons or is damaging objects if not handled in a correct way, which also could be the case if a malfunction of the movable stand occurs. To avoid accidents, the lifting device with the labelling unit is therefore often placed in fenced areas, which is a costly solution that takes up large floor areas.

There is thus a need for an improved lifting device with a compact, safe, and simple construction, where the labelling unit can be repositioned with high speed and with high precision. Since the lifting device is robust in construction, carrying high loads, and is repositioned with high speed, there is a need to construct the lifting device to prevent accidents and damage to objects when the labelling unit is repositioned or when the labelling unit is displaced in an unwanted manner.

SUMMARY

An object of the present disclosure is to provide a safety lifting device where the previously mentioned problems are avoided. This object is at least partly achieved by the features of the independent claim. The dependent claims contain further developments of the safety lifting device The disclosure concerns a safety lifting device positioning a labelling unit in a vertical direction in relation to a flow of objects where the labelling unit is arranged for printing labels and/or applying labels to the objects. The lifting device comprises a linear actuator, a balancing unit, a drive unit connected to the linear actuator, and a movable section, and the labelling unit is connected to the movable section. The linear actuator is connected to the movable section and arranged to control the position of the labelling unit in the vertical direction in relation to the flow of objects through displacing the movable section in an upwards direction and/or a downwards direction to a labelling position of the labelling unit, where in the labelling position the labels are printed and/or applied to the objects. The balancing unit is connected to the movable section and arranged to interact with and support the linear actuator and counterbalancing the gravitational force exerted on the linear actuator by the labelling unit and the movable section, preventing high loads on the linear actuator. The movable section of the lifting device comprises an upper stand unit and the lifting device further comprises a stationary lower stand unit arranged on a support surface. The upper stand unit is movably arranged in relation to the lower stand unit in the vertical direction, and the labelling unit is attached to the movable section. The linear actuator and the balancing unit are arranged inside the lower stand unit and the upper stand unit.

Advantages with these features are that through the balancing of the lifting device the load exerted on the drive unit is low, and the labelling unit can be moved with high speed and positioned with high precision since the drive unit is not used for moving heavy loads. The load is carried by the balancing unit and therefore a smaller drive unit that can be controlled with high precision can be used. Further, the lifting device is providing a safe and simple construction, where the labelling unit can be repositioned from one position to another with high speed and with high precision through the interaction between the linear actuator and the balancing unit. Since a smaller drive unit can be used, the balancing unit is further used for preventing unwanted displacement of the labelling unit in the downwards direction. A smaller drive unit is providing a safer construction, since the force exerted on the movable section with a smaller drive unit is lower compared to traditional solutions that require more powerful drive units. A smaller drive unit gives in this way low impact forces in case the labelling unit or the movable section is interfering with persons or objects. The balancing unit is connected to the movable section and arranged to interact with and support the linear actuator and counterbalancing the gravitational force exerted on the linear actuator by the labelling unit and the movable section. The upper stand unit and the lower stand unit are telescopically arranged in relation to each other, which gives a compact design of the lifting device. Since the labelling unit is attached to the movable section, the labelling unit moves together with the movable section when the movable section is displaced in the vertical direction. The linear actuator and the balancing unit are arranged inside the lower stand unit and the upper stand unit. This provides a compact design of the lifting device, where the linear actuator and the balancing unit also are protected from dust or other contaminants.

According to an aspect of the disclosure, the lower stand unit comprises a lower support bracket and the upper stand unit comprises an upper support bracket, wherein each of the linear actuator and the balancing unit are connected to the lower support bracket and the upper support bracket respectively. With this arrangement, the linear actuator and the balancing unit are positioned in relation to the lower stand unit and the upper stand unit, and can through the lower support bracket and the upper support bracket be securely attached to the respective stand units.

According to another aspect of the disclosure, the linear actuator is a mechanical linear actuator, arranged for mechanically displacing the movable section. The linear actuator comprises a ball screw unit arranged for translating a rotational motion of the drive unit to a linear movement of the labelling unit, where the ball screw unit comprises a ball screw connected to the drive unit and a ball nut in engagement with the ball screw. The ball screw unit provides an efficient and cost effective solution that can control the movement of the movable section and the labelling unit with high precision. The ball screw unit can be efficiently controlled with the drive unit and the ball screw unit can be steered with high precision during linear displacement.

According to a further aspect of the disclosure, the drive unit is connected to the upper support bracket and the ball nut is connected to the lower support bracket, wherein the ball screw is rotatably engaged with the ball nut, and wherein the movable section comprises the drive unit and the ball screw. In this way, the ball screw unit is connected to the parts of the lifting device so that a moving action can be applied to the movable section.

According to an aspect of the disclosure, the balancing unit comprises a pneumatic cylinder arranged for applying a pneumatic force counterbalancing the gravitational force exerted on the linear actuator, wherein the pneumatic cylinder comprises a piston rod and a barrel connected to a source of compressed air. The pneumatic cylinder provides an efficient and cost effective solution. The pneumatic cylinder can be efficiently controlled with valves and regulators to balance the gravitational force. The pneumatic cylinder is further providing a solution with a constant force independent of the position of the pneumatic cylinder, which pneumatic force also is possible to control in a stepless manner.

According to another aspect of the disclosure, the piston rod is connected to the upper support bracket and the barrel is connected to the lower support bracket. In this way, the pneumatic cylinder unit is connected to the parts of the lifting device so that a counterbalancing action can be applied to the movable section.

According to an aspect of the disclosure, the labelling unit is connected to the movable section via at least one support arm, wherein a first end of the support arm is attached to the movable section and a second end of the support arm to the labelling unit. The at least one support arm is used for positioning the labelling unit in relation to the objects that are labelled, and provides an efficient and simple construction of the lifting device, and further a flexible design where the support arm can be arranged in different positions on the movable section with for example holder brackets.

According to other aspects of the disclosure, the drive unit is arranged inside the movable section, and the drive unit is connected to the linear actuator via a gear unit. The arrangement of the drive unit inside the movable section gives a compact and efficient design of the lifting device. The gear unit can be used if desired to find a suitable gearing of the linear actuator.

According to other aspects of the disclosure, a position sensor for positioning the labelling unit in the vertical direction is arranged inside the movable section, and the position sensor is a laser position sensor, an ultrasonic position sensor or an optical position sensor. The position sensor is used for positioning the movable section with high precision.

According to other aspects of the disclosure, the balancing unit is provided with a safety brake arrangement configured to prevent the movable section from unwanted displacement in the downwards direction if a malfunction of the linear actuator occurs and/or if a malfunction of the pneumatic source to the balancing unit occurs, and the safety brake arrangement is a friction brake arranged to interact with a movable part of the balancing unit. The safety brake arrangement is providing a safe system that stops the lifting device from further movement or from moving if in a standstill position. A friction brake is an efficient and cost effective solution that gives good braking performance, where the locking position of the friction brake can be controlled in a stepless manner.

According to an aspect of the disclosure, the drive unit is a stepper motor adapted for positioning the linear actuator with high precision. The stepper motor can control the displacement of the labelling unit in the vertical direction with high precision. The stepper motor can be controlled by a control unit to secure the displacement of the movable section with high accuracy, and the stepper motor is controlling the linear actuator with high precision. Since the system is balanced by the balancing unit, the stepper motor can be used in a continuous drive mode also for heavy loads.

BRIEF DESCRIPTION OF THE DRAWINGS

The disclosure will be described in greater detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
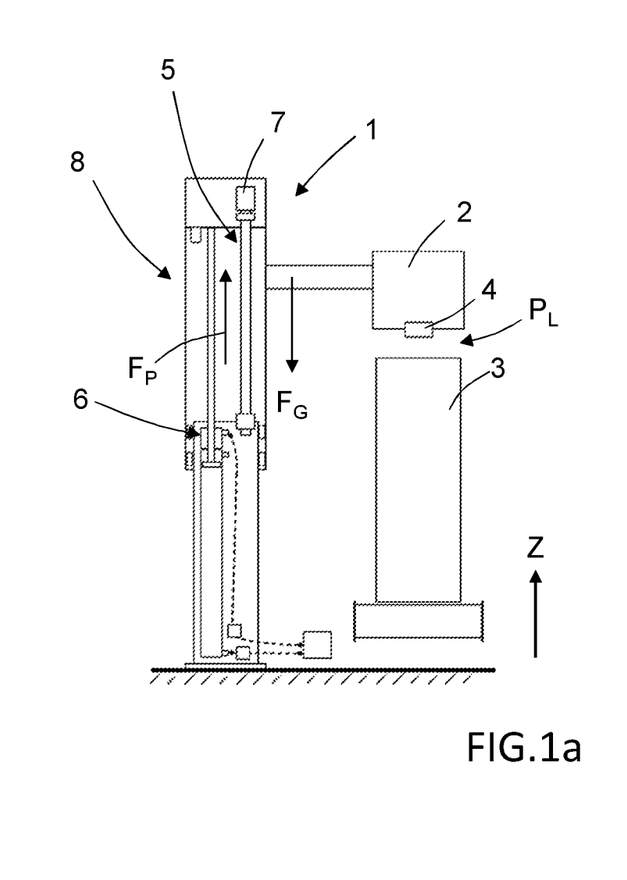
FIG. 1a-b show schematically, cross-sectional side views of a safety lifting device in a raised and a lowered position according to the disclosure.
Figure 1B:
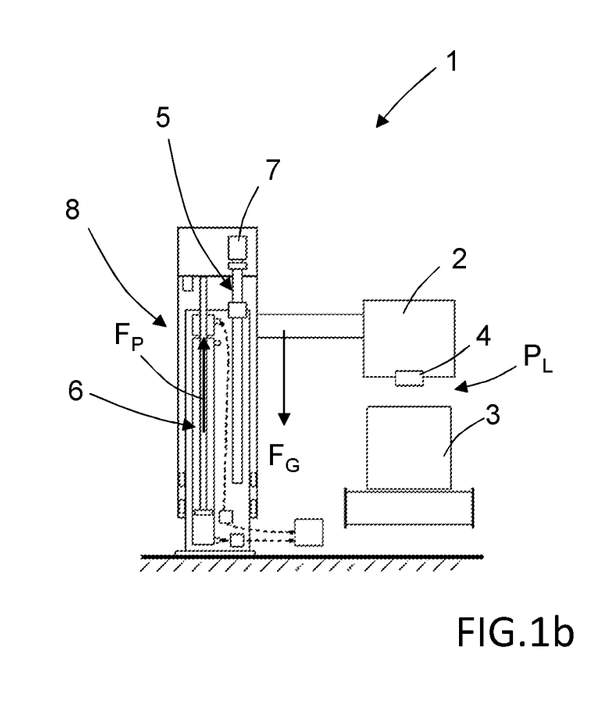
Figure 2:
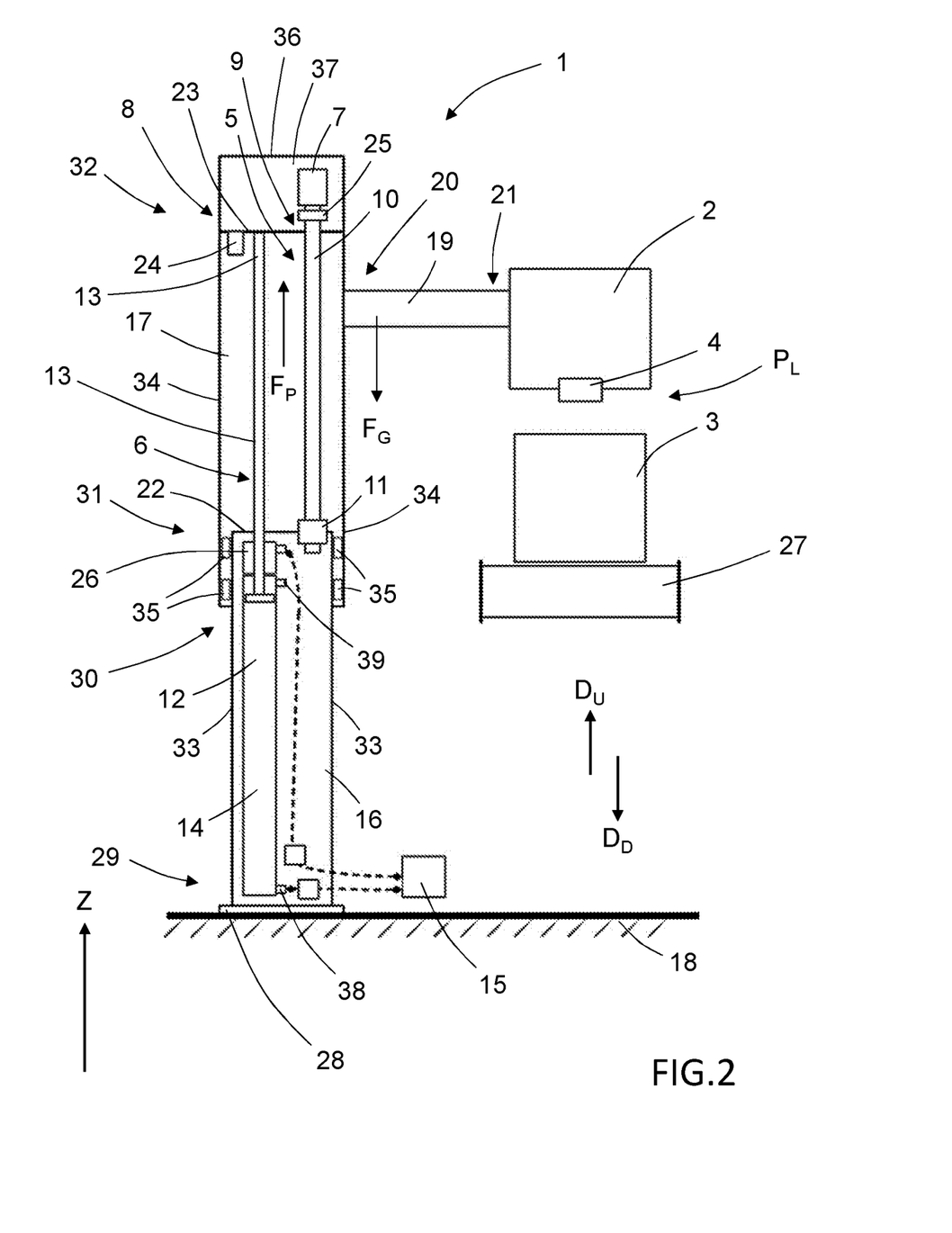
FIG. 2 shows schematically, a cross-sectional side view of the safety lifting device in a raised position according to the disclosure.
Figure 3:
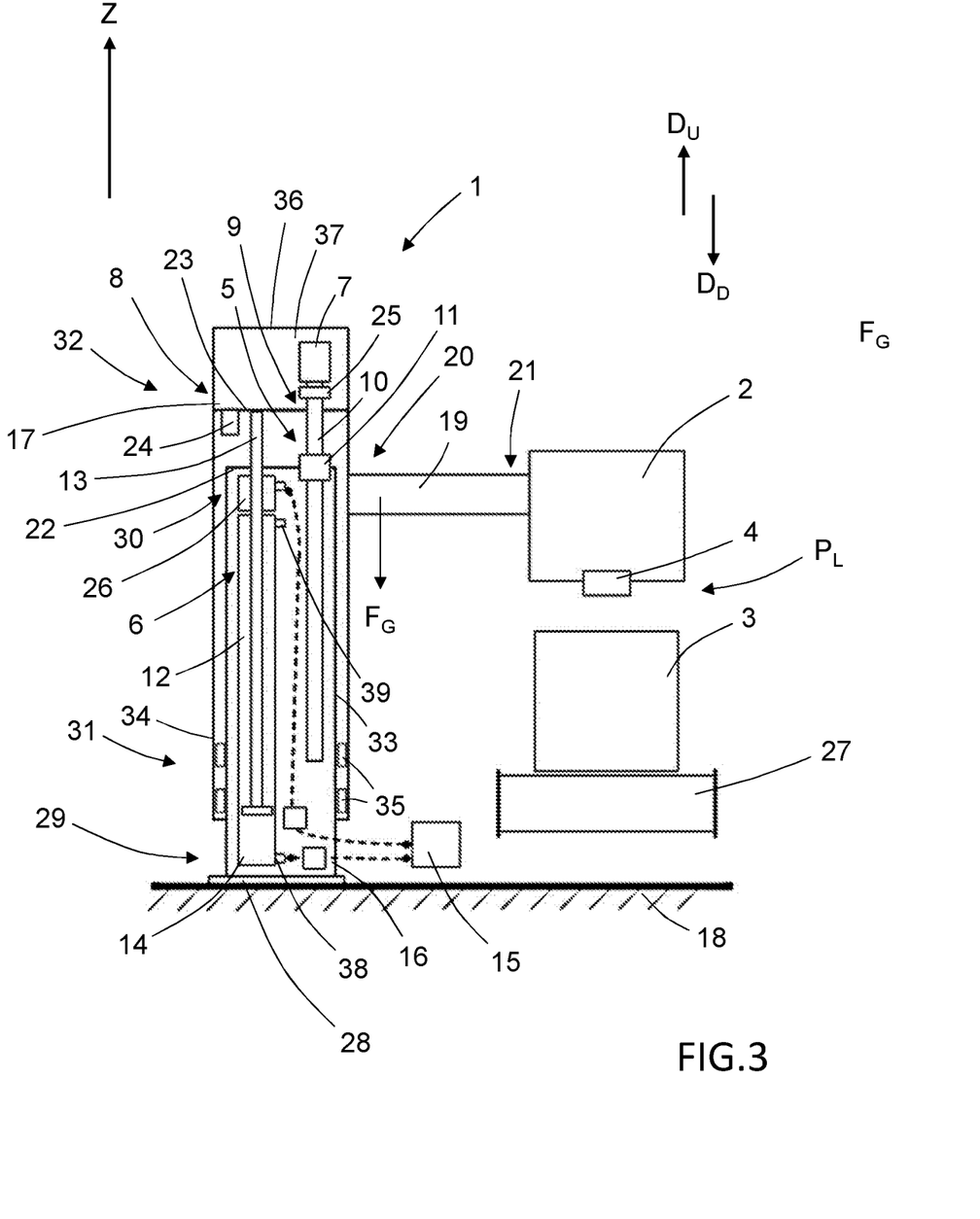
FIG. 3 shows schematically, a cross-sectional side view of the safety lifting device in a lowered position according to the disclosure.
Figure 4:
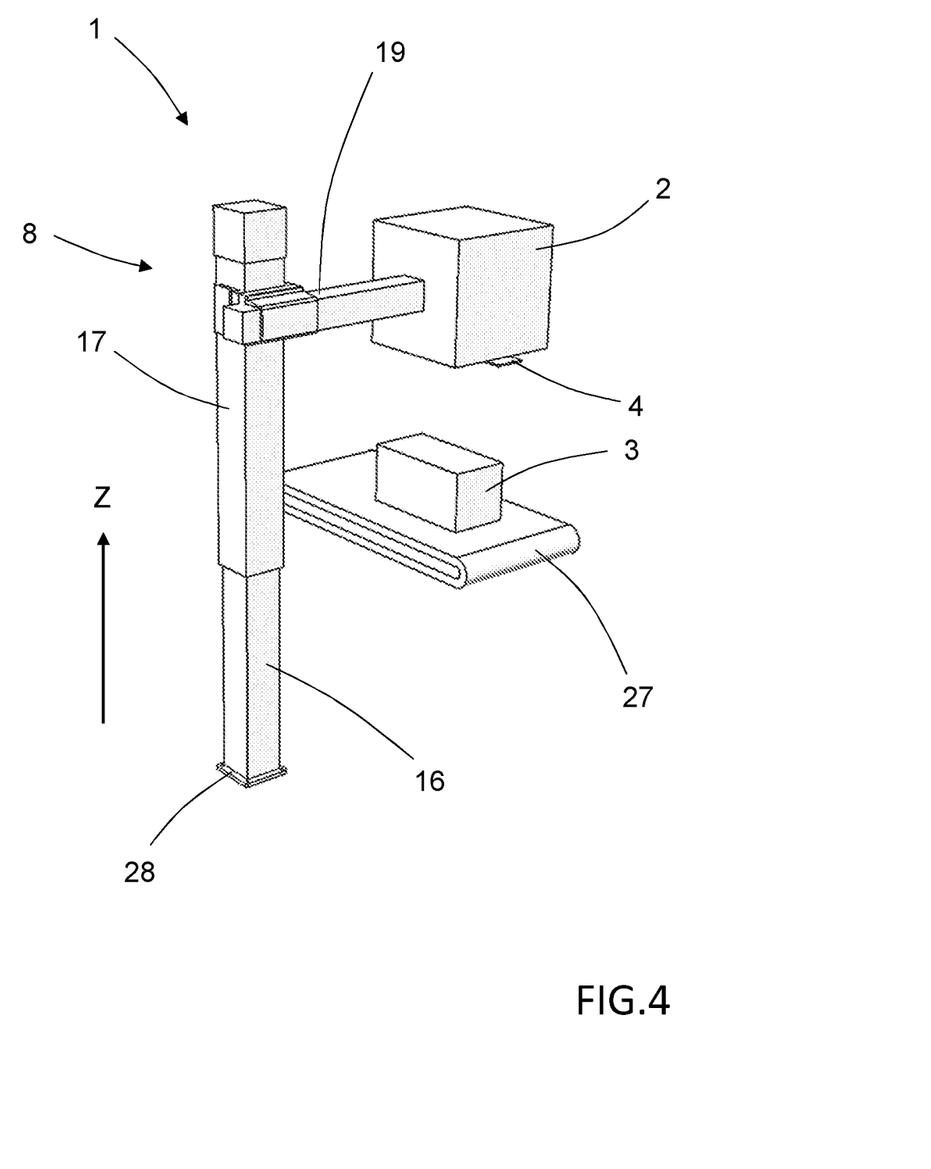
FIG. 4 shows schematically, in a perspective view, the safety lifting device with a labelling unit according to the disclosure.

FIGS. 1a, 1b, and 2-4 schematically show a safety lifting device 1 according to the disclosure. The safety lifting device 1 is positioning a labelling unit 2 in a vertical direction Z in relation to a flow of objects 3. In FIGS. 1a, 2, and 4 the lifting device is shown in a raised position, and in FIGS. 1b and 3 the lifting device 1 is shown in a lowered position. The lifting device 1 is arranged for positioning the labelling unit 2 in the vertical direction in any desired position between a maximum position and a minimum position of the lifting device 1 in the vertical direction Z, and the limiting maximum and minimum positions may vary depending on the construction and design of the lifting device 1.

The objects 3 could be any types of products or goods that should be labelled or marked and typically the objects 3 are in the form of boxes or pallets that are transported on a conveyor belt 27 or similar transportation arrangement. The labelling unit 2 is arranged for printing labels 4 and/or applying labels 4 to the objects 3.

The labelling unit 2 may be any type of conventional labelling device known in the art. The labelling unit 2 can for example be an applicator unit that is applying pre-printed labels on the objects 3. The labelling unit 2 may also be a print and apply unit, where the labelling unit 2 comprises a printer unit for printing the labels and an applicator unit that is transporting the labels 4 from the printer to the objects 3 and further applying the labels 4 on the objects 3. The labels 4 can for example be transported to and applied to the objects with movable arms or with a belt system. The labelling unit 2 may also be a printer unit that is printing labels 4 to an applicator unit arranged separately from the labelling unit 2.

The labels 4 could be of any suitable type, and as described above, the labels 4 may be pre-printed or printed in the printing unit of the labelling unit 2. Often self-adhesive labels are used, where the labels in a conventional way are provided with an adhesive layer on one side and carried by a paper web or similar structure that is holding the labels spaced apart.

The objects 3 that are passing the labelling unit 2 may vary in size and therefore the position of the labelling unit 2 needs to be altered depending on the size of the objects 3, as illustrated in FIGS. 1a and 1b. Further, the lifting device 1 may be used for conveyor belts 27 on different heights, or the conveyor belt 27 may be arranged to be repositioned in the vertical direction Z and therefore the position of the labelling unit 2 needs to be altered depending on the position of the conveyor belt 27, as illustrated in FIGS. 2 and 3. The conveyor belt 27 is often placed in a position below or besides the labelling unit 2 and to achieve a correct labelling position $P_L$ of the labelling unit 2 in relation to the objects 3, the lifting device 1 is adjustable in the vertical direction Z. The correct labelling position $P_L$ may vary depending on the type of objects 3 and also on which side or end of the objects 3 the labels 4 are applied. The labelling position $P_L$ can be manually determined by an operator or automatically by a sensor unit connected to the labelling machine.

The lifting device 1 comprises, as shown in FIGS. 1a, 1b, and 2-4, a linear actuator 5, a balancing unit 6, a drive unit 7, and a movable section 8. The drive unit 7 is connected to the linear actuator 5, and the drive unit 7 is used for moving the linear actuator 5 into a desired position as will be further described below. The labelling unit 2 is connected to the movable section 8 and the movable section 8 is used for positioning the labelling unit 2 in the vertical direction Z in relation to the flow of objects 3. The linear actuator 5 is connected to the movable section 8 and is positioning the movable section 8 in the vertical direction Z.

The movable section 8 is arranged to control the position of the labelling unit 2 in the vertical direction Z in relation to the flow of objects 3. The position of the labelling unit 2 in the vertical direction Z is thus controlled through displacing the movable section 8 in the vertical direction Z. Since the labelling unit 2 is connected to the movable section 8, a repositioning of the movable section 8 will result in a repositioning of the labelling unit 2 and by moving the movable section 8 in a vertical direction, the position of the labelling unit 2 in the vertical direction can be altered into the desired labelling position $P_L$. The labelling position $P_L$ is a position suitable for the printing of labels and/or the application of labels 4 on the objects 3, and as described above the correct labelling position $P_L$ may vary depending on the type of objects 3 and also on which side or end of the objects 3 the labels 4 are applied. The lifting device 1 is constructed so that the movable section 8 can be vertically displaced both in an upwards direction $D_U$ and in a downwards direction $D_D$ to the labelling position $P_L$ of the labelling unit 2, where in the labelling position $P_L$ the labels 4 are printed and/or applied to the objects 3. The displacement of the lifting device 1 in the upwards direction $D_U$ or the downwards direction $D_D$ to the correct labelling position $P_L$ can be manually controlled by an operator, or automatically controlled by a suitable sensor system arranged on the lifting device 1, the labelling unit 2, or arranged as a separate unit. The lifting device 1 may be arranged with a control panel or other control arrangements to steer the movement of the lifting device 1 when operated manually.

As shown in FIGS. 1a, 1b, and 2-3, the lifting device 1 further comprises a stationary lower stand unit 16 arranged on a support surface 18, such as a floor surface. The lower stand unit 16 is attached to the support surface 18 in any suitable way. The lower stand unit 16 may be provided with a base plate 28 or similar structure that is attaching a lower part 29 of the lower stand unit 16 to the support surface 18 with bolts, screws or other suitable fastening means, and through the attachment to the support surface 18 the lower stand unit 16 is providing a stable and reliable support structure for the lifting device 1 and the labelling unit 2.

The movable section 8 of the lifting device 1 comprises an upper stand unit 17, and the labelling unit 2 is connected to the upper stand unit 17. The labelling unit 2 may be attached to the upper stand unit 16 in any suitable way. In the embodiment shown in the figures, the labelling unit 2 is connected to the upper stand unit 17 via at least one support arm 19. A first end 20 of the support arm 19 is attached to the upper stand unit 17 with for example a holder bracket or similar arrangement, and a second end 21 of the support arm 19 is attached to the labelling unit 2. Also the second end 21 of the support arm 19 may be attached to the labelling unit 2 with for example a holder bracket or similar structural arrangement. The support arm 19 may if desired be arranged in different positions in the vertical direction on the upper stand unit 17 and on different sides of the upper stand unit 17 with the holder bracket.

The support arm 19 has an elongated shape in the shown embodiment, but the support arm 19 may have any suitable shape depending on the construction and design of the lifting device 1 and the labelling unit 2. The support arm 19 may have different dimensions depending on the specific labelling application, and be made in one or several constructional parts. The support arm 19 may for example have a square hollow or tubular configuration with an essentially square or circular cross-sectional shape. However, other suitable cross-sectional shapes are also possible if desired. The support arm can be made of any suitable material, such as for example aluminum, steel, plastic materials, composite materials, or of combinations of different materials.

As shown in FIGS. 1a, 1b, and 2-3, the lower stand unit 16 and the upper stand unit 17 have elongated shapes and are extending in the vertical direction Z. The upper stand unit 17 is movably arranged in relation to the lower stand unit 16 in the vertical direction. The upper stand unit 17 is arranged in relation to the lower stand unit 16 so that the upper stand unit 17 can move in the vertical direction outside the lower stand unit 16, wherein at least a lower part 31 of the upper stand unit 17 is encompassing at least the upper part 30 of the lower stand unit 16, depending on the position of the upper stand unit 17 in relation to the lower stand unit 16 in the vertical direction Z. In the embodiment shown, the upper stand unit 17 thus has a telescopic configuration so that side walls 34 of the upper stand unit 17 are arranged on the outside of side walls 33 of the lower stand unit 16. To ensure that the upper stand unit 17 is moving in the vertical direction without movements in other directions, one or more slide bushings 35 are arranged between the upper stand unit 17 and the lower stand unit 16. The slide bushings 35 can be arranged as one or more collars between the upper stand unit 17 and the lower stand unit 16, or as discrete pieces of material arranged between the upper stand unit 17 and the lower stand unit 16. The slide bushings 35 are configured so that they allow the upper stand unit 17 to move in the vertical direction Z in relation to the lower stand unit 16 with low friction and at the same time ensuring that any play between the upper stand unit 17 and the lower stand unit 16 is minimized, preventing movements in other directions. The slide bushings 35 can be made of any suitable material, such as for example plastic materials, composite materials, rubber materials or metals. The upper stand unit 17 and the lower stand unit 16 can have corresponding cross-sectional profiles, such as square, rectangular, circular, or other suitable shapes. In the embodiment shown in FIG. 4, the upper stand unit 17 and the lower stand unit 16 have essentially square cross-sectional profiles when viewed from above. It should be understood that in an alternative embodiment the upper stand unit 17 instead may be arranged inside the lower stand unit 16. The upper stand unit and the lower stand unit can be made of any suitable material, such as for example aluminum, steel, plastic materials, composite materials, or of combinations of different materials.

As shown in FIGS. 1 and 2, the lower stand unit 16 comprises a lower support bracket 22 arranged inside or on the lower stand unit 16 in the upper part 30 of the lower stand unit 16 as an integrated or attached constructional part. The lower support bracket 22 is arranged for attaching the linear actuator 5 and the balancing unit 6 to the lower stand unit 16. The lower support bracket 22 may be arranged as a plate or similar structure arranged inside the lower stand unit 16 to which the different components of the lifting device 1 can be attached. The lower support bracket 22 can be made of any suitable material, such as for example aluminum, steel, plastic materials, composite materials, or of combinations of different materials.

The upper stand unit 17 comprises an upper support bracket 23 arranged inside the upper stand unit 17 in the upper part 32 of the upper stand unit 17, and the upper support bracket 23 is an integrated or attached constructional part of the movable section 8. The upper support bracket 23 is arranged for attaching the linear actuator 5 and the balancing unit 6 to the upper stand unit 17. The upper support bracket 23 may be arranged as a plate or similar structure arranged inside the upper stand unit 17 to which the different components of the lifting device 1 can be attached. The upper support bracket 23 can be made of any suitable material, such as for example aluminum, steel, plastic materials, composite materials, or of combinations of different materials.

As shown in FIGS. 1 and 2, through the arrangement with the lower support bracket 22 and the upper support bracket 23, the linear actuator 5 can be arranged to interact with and be connected to the lower support bracket 22 and the upper support bracket 23 respectively. In the same way, the balancing unit 6 can be arranged to interact with and be connected to the lower support bracket 22 and the upper support bracket 23 respectively.

The linear actuator 5 is, as described above, connected to the upper support bracket 23 of the movable section 8, and also to the lower support bracket 22 of the lower stand unit 16. The linear actuator 5 is through this construction arranged inside the lower stand unit 16 and the upper stand unit 17. The linear actuator 5 is used for displacing the movable section 8 in the upwards direction $D_U$ and the downwards direction $D_D$ so that the labelling unit 2 can be positioned in the correct labelling position $P_L$. The linear actuator 5 may be of any suitable type. The lower support bracket 22 and the upper support bracket 23 can be provided with openings and fasteners needed for mounting and operating the linear actuator 5.

As shown in FIGS. 1 and 2, the linear actuator 5 is a mechanical linear actuator that is arranged for mechanically displacing the movable section 8 in relation to the lower stand unit 16. The mechanical linear actuator is comprising a ball screw unit 9 arranged for translating a rotational motion of the drive unit 7 to a linear movement of the labelling unit 2 with high precision. The ball screw unit 9 may be of any suitable conventional type. The ball screw unit 9 in the shown embodiment comprises a ball screw 10 connected to the drive unit 7 and a ball nut 11 in engagement with the ball screw 10. The ball screw 10 is arranged with threads providing a helical raceway for ball bearings or a ball assembly arranged in the ball nut 11. When the ball screw 10 is rotating the ball nut 11 travels along the ball screw 10, and depending on the rotational direction of the ball screw 10, the ball nut 11 can travel in opposite directions along the ball screw 10. The pitch of the helical raceway is determining the gear ratio between the rotating drive unit 7 and the linear movement of the ball nut along 11 the ball screw 10, and therefore a suitable pitch and drive speed is determined when designing the system. The drive unit 7 can be designed as a variable speed drive unit for controlling the speed of the displacement in the vertical direction.

As shown in FIGS. 1 and 2, the drive unit 7 is connected to the upper support bracket 23, and the ball screw 10 is thus connected to the upper support bracket 23 through the drive unit 7. The drive unit 7 can be attached to the upper support bracket 23 with bolts, screws or other suitable fastening members, and as shown in the figures, the drive unit 7 is arranged inside the movable section 8 within the upper stand unit 17 above the upper support bracket 23. The upper stand unit 17 may be provided with a cover plate 36 or similar structure for forming an inner space 37 inside the upper part 32 of the upper stand unit 17, between the upper support bracket 23 and the cover plate 36. The inner space 37 is used for housing components of the lifting device 1, such as for example the drive unit 7. The ball screw 10 is connected to the drive unit 7 and is in the embodiment shown extending downwards from the drive unit 7 in the vertical direction Z. As described above, the lower support bracket 22 and the upper support bracket 23 can be provided with openings and fasteners needed for mounting and operating the ball screw unit 9, and the upper support bracket 23 may for example be provided with an opening for the ball screw 10 so that the ball screw 10 can move inside the lower stand unit 16 when the lifting device is displaced in the vertical direction. In the embodiment shown in FIG. 3, a major part of the ball screw 10 is arranged inside the lower stand unit 16 in the lowered position.

The ball screw 10 of the ball screw unit 9 could be directly connected to the drive unit 7, or alternatively indirectly connected to the drive unit 7 via a gear unit 25. In this way the drive unit 7 is connected to the linear actuator 5 via the gear unit 25 and the gear unit 25 is used for establishing a suitable gearing. The gear unit 25 is part of the movable section 8 and may be of any conventional type, such as for example a belt drive unit or a toothed gear unit.

The ball screw 10 is rotatably engaged with the ball nut 11 of the ball screw unit 9, and the ball nut 11 is non-rotatably connected to the lower support bracket 22. The ball nut 11 can be attached to the lower support bracket 22 with bolts, screws or other suitable fastening members. The ball screw unit 9 is used for moving the movable section 8 in relation to the lower stand unit 16 and when the drive unit 7 is driving the ball screw 10 in a first rotational direction, the movable section 8 is moved in the upwards direction $D_U$. When the drive unit 7 is driving the ball screw 10 in a second rotational direction opposite the first rotational direction, the movable section 8 is moved in the downwards direction $D_D$. It should be noted that the movable section 8 comprises the drive unit 7 and the ball screw 10, and the drive unit 7 and the ball screw 10 are thus part of the movable section 8. In an alternative embodiment, the ball nut 11 may instead be non-rotatably connected to a suitable support bracket arranged in the upper stand unit 17 and the ball screw 10 though the drive unit 7 connected to a suitable support bracket arranged in the lower stand unit 16.

The drive unit 7 may be of any suitable conventional type, such as for example an electric motor. The type of electric motor can be chosen to fit the specific design of the lifting device 1. In order to control the displacement of the labelling unit 2 in the vertical direction with high precision, a stepper motor can be used. The stepper motor can be controlled by a control unit to secure the displacement of the movable section 8 in relation to the lower stand unit 16 with high precision, where the stepper motor with high accuracy in a stepwise manner is rotating the ball screw 10 into a desired rotational position. Since the stepper motor can be controlled with incremental steps, the positioning of the lifting device 1 and labelling unit 2 can be made with high precision compared to traditional high power electric motors normally used in lifting devices. Since the system is balanced by the balancing unit 6, the stepper motor can be used in a continuous drive mode also for heavy loads.

As described above, the lifting device 1 further comprises the balancing unit 6. The balancing unit 6 is, as described above, connected to the upper support bracket 23 of the movable section 8, and also to the lower support bracket 22 of the lower stand unit 16. The lower support bracket 22 and the upper support bracket 23 can be provided with openings and fasteners needed for mounting and operating the balancing unit 6. The balancing unit 6 is through this construction arranged inside the lower stand unit 16 and the upper stand unit 17. The balancing unit 6 is thus connected to the movable section 8 and arranged to interact with and support the linear actuator 5. The balancing unit 6 is arranged for counterbalancing the gravitational force $F_G$ exerted on the linear actuator 5 by the labelling unit 2 and the movable section 8 and through this counterbalancing action the load exerted on the drive unit is low and unwanted displacement of the labelling unit 2 in the downwards direction $D_D$ can be prevented. The balancing unit 6 is designed to push the movable section 8 and the labelling unit 2 the upwards direction $D_U$ with a force that is corresponding to the gravitational force $F_G$ exerted on the linear actuator 5 by the labelling unit 2 and the movable section 8.

Through the counterbalancing action by the balancing unit 6 the load exerted on the drive unit 7 is low, and the labelling unit 2 can be moved by the drive unit 7 and linear actuator 5 with high speed and positioned with high precision since the drive unit 7 is not used for moving heavy loads. The load is instead carried by the balancing unit 6 through the counterbalancing action and therefore a small drive unit 7 that can be controlled with high precision can be used. The labelling unit 2 can be repositioned from one position to another with high speed and with high precision through the interaction between the linear actuator 5 and the balancing unit 6. Since a smaller drive unit 7 can be used, the balancing unit 6 is further used for preventing unwanted displacement of the labelling unit 2 in the downwards direction. A smaller drive unit 7 is providing a safer construction, since the force exerted on the movable section during movement low, which gives low impact forces in case the labelling unit 2 or the movable section 8 is interfering with persons or objects.

The balancing unit 6 may be of any suitable type, and in the embodiment shown in the figures, the balancing unit is a pneumatic actuator. The balancing unit 6 comprises a pneumatic cylinder 12 arranged for applying a pneumatic force $F_P$ that is counterbalancing the gravitational force $F_G$ exerted on the linear actuator 5. The pneumatic cylinder 12 can be of any suitable conventional type. The pneumatic cylinder 12 can also be used for supporting the drive unit 7 during displacement of the labelling unit 2 in the upwards direction $D_U$, wherein the applied pneumatic force $F_P$ during the displacement sequence is higher than the gravitational force $F_G$.

The pneumatic cylinder 12 in the shown embodiment comprises a piston rod 13 and a barrel 14 connected to a source of compressed air 15 via a hose, pipe or other suitable means. The piston rod 13 is arranged to move in relation to the barrel 14. As described above, the lower support bracket 22 and the upper support bracket 23 can be provided with openings and fasteners needed for mounting and operating the pneumatic cylinder 12. The lower support bracket 22 may be provided with an opening for the piston rod 13 so that the piston rod can move inside the upper stand unit 17 when the lifting device is displaced in the vertical direction Z. In the embodiment shown in FIG. 2, a major part of the piston rod 13 is arranged inside the upper stand unit 17 in the raised position. The pneumatic cylinder 12 has two chambers and air is allowed to flow into our out from the respective chambers through flow ports depending on the movement of the piston rod 13 in relation to the barrel 14. In the embodiment shown in FIGS. 1 and 2, the pneumatic cylinder has a lower flow port 38 arranged in a lower end of the barrel 14 and an upper flow port 39 arranged in an upper end of the barrel 14. When compressed air is flowing into the lower flow port 38 and out from the upper flow port 39, the piston rod 13 is moving in the direction upwards $D_U$. To move the piston rod 13 in the direction downwards $D_D$, air is allowed to flow out from the lower flow port 38 and air is then flowing into the upper flow port 39. There is no need to feed compressed air to the upper flow port 39 of the pneumatic cylinder 12 during the displacement in the downwards direction $D_D$, since the gravitational force exerted on the piston rod 13 will push the piston rod 13 downwards. As an alternative, compressed air can be fed into the upper flow port 39 when displacing the piston rod 13 in the direction downwards $D_D$ if desired. Valves and suitable pneumatic regulators are used for controlling the air flow and pressure level to steer the movement of the piston rod 13 of the pneumatic cylinder 12 in the upwards and downwards directions respectively.

As shown in the figures, the piston rod 13 is connected to the upper support bracket 23 and the barrel 14 is connected to the lower support bracket 22. The piston rod 13 and the barrel 14 can be attached to the upper support bracket 23 and the lower support bracket 22 respectively with suitable fastening members, such as for example bolts or screws. In an alternative embodiment, the piston rod 13 may instead be connected to a support bracket arranged in the lower stand unit 16 and the barrel 14 to a support bracket arranged in the upper stand unit 17.

The balancing unit 6 is used for counterbalancing the gravitational force $F_G$ exerted on the linear actuator 5. The piston rod 13, according to the embodiment shown in FIGS. 1 and 2, is when being actuated in a direction upwards applying the pneumatic force $F_P$ to the upper support bracket 23, and the upwards directing pneumatic force $F_P$ is thus counterbalancing the gravitational force $F_G$. When the pneumatic force $F_P$ is equal to the gravitational force $F_G$, the lifting device 1 is fully balanced and in this way the linear actuator 5 can be used for positioning the movable section 8 with the labelling unit 2 without a need for displacing the load of the movable section 8 and the labelling unit 2. Since the system is balanced through the balancing unit 6 a small electric motor with high precision, such as the stepper motor described above, can be used as drive unit 7 to position the labelling unit 2 in the correct labelling position $P_L$. Through the pneumatic force a safe system is achieved where the counterbalancing pneumatic force $F_P$ is preventing high loads on the drive unit 7 and unwanted displacement of the labelling unit 2 in the downwards direction $D_D$.

The linear actuator 5 and the balancing unit 6 may be connected to a control unit that is controlling the position of the labelling unit 2 in the vertical direction Z through steering the drive unit 7 and the balancing unit 6 with high precision. When repositioning the labelling unit 2 in the vertical direction from one labelling position to another labelling position, the drive unit 7 is used for rotating the ball screw 10 so that the labelling unit 2 is positioned in the correct labelling position $P_L$. During the repositioning of the labelling unit 2, the balancing unit 6 is controlled so that the balancing pneumatic force $F_P$ is maintained when the labelling unit 2 is moving in the upwards direction $D_U$ or in the downwards direction $D_D$. The pneumatic cylinder 12 of the balancing unit 6 can for example be provided with regulators that are controlling the pneumatic pressure in the pneumatic cylinder 12 so that the correct balancing pneumatic force $F_P$ is applied to the movable section 8 via the upper support bracket 23. When attaching the labelling unit 2 to the lifting device 1, the system needs to be calibrated. To calibrate the system, a pneumatic force $F_P$ corresponding to the gravitational force $F_G$ is applied. This calibrating operation may for example be performed when the lifting device is its lowest position, and through applying an increasing pneumatic force $F_P$ to the movable section 8 through the pneumatic cylinder 12. When a pneumatic force $F_P$ equal to the gravitational force $F_G$ is applied to the movable section 8, the system starts to move in the upwards direction $D_U$ and a pressure sensor could be used for measuring the pressure level in the pneumatic cylinder 9 at the point where the system starts to move to find the correct balancing pressure. To detect when the system starts to move a position sensor 24 can be used. As an alternative, the drive unit 7, such as the stepper motor with an encoder, can be used for detecting the movement of the system.

If using the stepper motor as the drive unit 7, the encoder can be used to monitor the rotational position of a shaft of the stepper motor. The encoder can also be used to identify if the lifting device 1 is blocked by an object or a person, wherein the stepper motor is prevented from further rotation. If the stepper motor is prevented from rotating, a signal could be sent to the control unit, and in this way the system can be stopped to prevent accidents or damage to the system. The encoder may also be arranged on the ball screw unit 9 if desired.

Through the balancing of the lifting device 1 with the pneumatic cylinder 12 and the use of a stepper motor as drive unit 7, the labelling unit 1 can be positioned with high precision. The balancing unit 6 is relieving the forces on the linear actuator 5, and in this way the drive unit 7 is not used for moving heavy loads. The design with interacting linear actuator 5 and balancing unit 6 is providing a safe and simple construction, where the labelling unit 2 can be repositioned with high speed and with high precision. The balancing of the movable section 8 is used for preventing unwanted displacement of the labelling unit 2 in the downwards direction, where the balancing unit 6 is connected to the movable section 8 and arranged to interact with and support the linear actuator 5 and counterbalancing the gravitational force exerted on the linear actuator 5 by the labelling unit 2 and the movable section 8, as described above. Through the prevention of unwanted displacement of the labelling unit 2 by the balancing unit 6 in the downwards direction a safe construction is achieved.

The balancing unit 6 can further be provided with an additional safety brake arrangement 26 configured to prevent the movable section 8 from unwanted displacement in the downwards direction $D_D$ if a malfunction of the linear actuator 5 occurs or if a malfunction of the balancing unit 6 occurs. The pneumatic cylinder 12 can be provided with the safety brake arrangement 26. The safety brake arrangement 26 is designed to be activated when needed independent of the position of the parts of the balancing unit 6, and can also be activated during movement of the system to prevent further movements of the system. As an example, a traditional friction brake system with a solenoid connected to a pressure sensor can be arranged to interact with a movable part, such as the piston rod 13, of the balancing unit 6. When a malfunction is occurring, such as a power failure, a breakdown of the drive unit 7, or a pressure drop in the pneumatic cylinder 12, the friction brake system prevents the piston rod 13 from moving. In an alternative embodiment, the safety brake arrangement 26 can be a fully pneumatic system, where the friction brake system is controlled by a valve connected to the source of compressed air 15. As long as the compressed air is supplied to the valve, the brake is inactivated. If a malfunction of the pneumatic system occurs, or if the source of compressed air 15 is disconnected from the pneumatic cylinder 12, so that no air is supplied to the valve, the brake will be automatically activated to prevent further movement of the piston rod 13. As indicated in the figures, the source of compressed air 15 is in this embodiment with a fully pneumatic system connected to the safety brake arrangement 26 via a hose, pipe or other suitable means.

The position sensor 24 can further be used for positioning the labelling unit 2 in the vertical direction Z, and the position sensor 24 can for example be arranged inside the movable section 8. The position sensor 24 can be any type of suitable position sensor known in the art, such as a laser position sensor, an ultrasonic position sensor or an optical position sensor.

It should be understood that suitable cables or hoses are used for supplying electricity and compressed air to the lifting device, and for powering the labelling unit 2. The cables or hoses can be arranged inside the lifting device and/or on the outside depending on the constructional design. The cables and hoses may for example be guided during movement of the lifting device in a traditional way with movable cable carriers. The control unit may be positioned on or inside the lifting device, or alternatively arranged as a separate unit.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A safety lifting device positioning a labelling unit in a vertical direction (Z) in relation to a flow of objects where the labelling unit is arranged for printing labels and/or applying labels to the objects,
   characterized in that the lifting device comprises a linear actuator, a balancing unit, a drive unit connected to the linear actuator, and a movable section, where the labelling unit is connected to the movable section;
   wherein the linear actuator is connected to the movable section and arranged to control the position of the labelling unit in the vertical direction (Z) in relation to the flow of objects through displacing the movable section (8) in an upwards direction ($D_U$) and/or a downwards direction ($D_D$) to a labelling position ($P_L$) of the labelling unit, where in the labelling position ($P_L$) the labels are printed and/or applied to the objects; and
   wherein the balancing unit is connected to the movable section and arranged to interact with and support the linear actuator and counterbalancing the gravitational force ($F_G$) exerted on the linear actuator by the labelling unit and the movable section, preventing high loads on the linear actuator,
   wherein the movable section of the lifting device comprises an upper stand unit, and the lifting device further comprises a stationary lower stand unit arranged on a support surface, wherein the upper stand unit is movably arranged in relation to the lower stand unit in the vertical direction (Z), and wherein the labelling unit is attached to the movable section,
   and wherein the linear actuator and the balancing unit are arranged inside the lower stand unit and the upper stand unit.

2. A safety lifting device according to claim 1, wherein the lower stand unit comprises a lower support bracket and the upper stand unit comprises an upper support bracket, wherein each of the linear actuator and the balancing unit are connected to the lower support bracket and the upper support bracket respectively.

3. A safety lifting device according to claim 1, wherein the linear actuator is a mechanical linear actuator, arranged for mechanically displacing the movable section, comprising a ball screw unit arranged for translating a rotational motion of the drive unit to a linear movement of the labelling unit, where the ball screw unit comprises a ball screw connected to the drive unit and a ball nut in engagement with the ball screw.

4. A safety lifting device according to claim 2, wherein the drive unit is connected to the upper support bracket and the ball nut is connected to the lower support bracket, wherein the ball screw is rotatably engaged with the ball nut, wherein the movable section comprises the drive unit and the ball screw.

5. A safety lifting device according to claim 1, wherein the balancing unit comprises a pneumatic cylinder arranged for applying a pneumatic force ($F_P$) counterbalancing the gravitational force ($F_G$) exerted on the linear actuator, wherein the pneumatic cylinder comprises a piston rod and a barrel connected to a source of compressed air.

6. A safety lifting device according to claim 2, wherein the piston rod is connected to the upper support bracket and the barrel is connected to the lower support bracket.

7. A safety lifting device according to claim 1,
wherein the labelling unit is connected to the movable section via at least one support arm, wherein a first end of the support arm is attached to the movable section and a second end of the support arm to the labelling unit.

8. A safety lifting device according to claim 1,
wherein the drive unit is arranged inside the movable section.

9. A safety lifting device according to claim 1,
wherein the drive unit is connected to the linear actuator via a gear unit.

10. A safety lifting device according to claim 1,
wherein a position sensor for positioning the labelling unit in the vertical direction (Z) is arranged inside the movable section.

11. A safety lifting device according to claim 10,
wherein the position sensor is a laser position sensor, an ultrasonic position sensor or an optical position sensor.

12. A safety lifting device according to claim 1,
wherein the balancing unit is provided with a safety brake arrangement configured to prevent the movable section from unwanted displacement in the downwards direction ($D_D$) if a malfunction of the linear actuator occurs and/or if a malfunction of the balancing unit occurs.

13. A safety lifting device according to claim 12,
wherein the safety brake arrangement is a friction brake arranged to interact with a movable part of the balancing unit.

14. A safety lifting device according to claim 1,
wherein the drive unit is a stepper motor adapted for positioning the linear actuator with high precision.

* * * * *